(12) United States Patent
Nobukiyo et al.

(10) Patent No.: US 7,949,077 B2
(45) Date of Patent: May 24, 2011

(54) RESPONSE PROBABILITY CALCULATING DEVICE AND METHOD, AND BASE STATION CONTROL DEVICE AND COMMUNICATION SYSTEM USING THE SAME

(75) Inventors: Takahiro Nobukiyo, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 681 days.

(21) Appl. No.: 12/049,637

(22) Filed: Mar. 17, 2008

(65) Prior Publication Data

US 2008/0240215 A1 Oct. 2, 2008

(30) Foreign Application Priority Data

Mar. 28, 2007 (JP) ................................ 2007-083218

(51) Int. Cl.
*H04L 27/06* (2006.01)
(52) U.S. Cl. ...................................... 375/340
(58) Field of Classification Search .................. 375/224, 375/340
See application file for complete search history.

(56) References Cited

U.S. PATENT DOCUMENTS

| | | | |
|---|---|---|---|
| 2004/0203829 A1* | 10/2004 | Miyoshi et al. | 455/452.1 |
| 2007/0297525 A1* | 12/2007 | Wu et al. | 375/260 |
| 2008/0176577 A1* | 7/2008 | Bourlas et al. | 455/454 |
| 2008/0261545 A1* | 10/2008 | Miyoshi et al. | 455/127.1 |

FOREIGN PATENT DOCUMENTS

| | | |
|---|---|---|
| EP | 1475984 A1 | 11/2004 |
| JP | 2006515737 A | 6/2000 |
| JP | 2005252506 A | 9/2005 |
| JP | 2006505979 A | 2/2006 |
| JP | 2006515496 A | 5/2006 |
| JP | 2006526316 A | 11/2006 |
| WO | 2006006965 A1 | 1/2006 |
| WO | 2007062297 A2 | 5/2007 |

OTHER PUBLICATIONS

UK Search Report for Application No. GB0805592.3 searched Jul. 30, 2008.

* cited by examiner

*Primary Examiner* — Don N Vo

(57) ABSTRACT

There is provided a response probability calculating method for use in a communication system in which a response probability is sent from a communication network to a plurality of terminals, and the terminals report terminal information to the communication network according to the response probability, including a step of selecting a first calculation formula for monotonously increasing the response probability or a second calculation formula for calculating the response probability using the response probability sent at the previous time and the previous number of responses in accordance with the number of responses from the terminals, and a step of calculating the response probability in accordance with the selected calculation formula.

20 Claims, 8 Drawing Sheets

RESPONSE PROBABILITY CALCULATING DEVICE AND METHOD, AND BASE STATION CONTROL DEVICE AND COMMUNICATION SYSTEM USING THE SAME

INCORPORATION BY REFERENCE

This application is based upon and claims the benefit of priority from Japanese patent application No. 2007-083218 filed on Mar. 28, 2007 the disclosure of which is incorporated herein in its entirety by reference.

BACKGROUND OF THE INVENTION

1. Field of the Invention

The present invention relates to a response probability calculating device and method, and a base station control device and communication system using the same, and more particularly to a response probability calculating method for use in a communication system for sending the same response probability to a plurality of communication terminals which report the terminal information at the response probability.

2. Related Art

For a Broadcast function and a Multicast function in a W-CDMA system, an MBMS (Multimedia Broadcast Multicast Service) is specified at Release 6 in a 3 GPP (3rd Generation Partnership Project).

In the MBMS, the same data is sent to all the cells simultaneously. The modes of data transmission include a PTM (Point-to-Multipoint) and a PTP (Point-to-Point). The PTM is a transmission mode of sending the data to every communication terminal (hereinafter simply referred to as a terminal) within the cell through one RL (Radio Link), in which a common channel SCCPCH (Secondary Common Control Physical Channel) set in each cell is used as a physical channel. Since this PTM can send the data through one RL, the radio resources can be saved. However, to cover the entire cell, a fully high sending power is required. Accordingly, for the terminals other than near the cell end (cell boundary), the data transmission is performed at excessively high power level.

On the other hand, the PTP is a transmission mode of transmitting the data to one terminal through one RL, in which a high speed physical downlink shared channel (HS-PDSCH) or a dedicated physical channel DPCH (Downlink Physical Channel) is used as the physical channel. The HS-PDSCH is a data channel of an HSDPA (High Speed Downlink Packet Access) method, and an AMCS (Adaptive Modulate and Coding Scheme) of changing a transmission rate according to a received signal quality is applied, whereby the data can be transmitted at higher speed than the DPCH.

A well-known inner loop control (Inner Loop Power Control) of changing a transmission power according to the received signal quality is applied to the DPCH. Accordingly, the PTP can save the radio resource per RL according to the received signal quality. However, since the total amount of sent data increases according to the number of MBMS receiving users, the transmission power is greater when there are a large number of MBMS data receiving users.

The RNC (Radio Network Controller or base station control device) measures the number of MBMS receiving users (N_count) for each cell in performing the MBMS. This process is called counting. In this counting, the response probability AP (Access Probability) of equal value is sent to all the users. Each user desiring to receive the MBMS data responds according to the response probability AP. For example, when AP is 10%, each MBMS receiving user responds at a probability of 10%.

The RNC measures N_count, using the number of users responding simultaneously at a certain AP (hereinafter a response number), and can decide the presence or absence of sending the MBMS data, the selection between the PTM transmission and the PTP transmission, and the switching between the PTM transmission channel and the PTP transmission channel, based on the measured N_count.

An example of measuring N_count with an arithmetical mean of two response numbers is described below. Assuming that AP is 10% and the simultaneous response number is 9 at the first time, and AP is 20% and the response number is 22 at the second time, N_count is measured as 100.

$$N\_count=(1/2)*\{(9/10\%)+(22/20\%)\}=100$$

Where * denotes the multiplication (the same sign is used in the following).

The RNC wishes to measure the number of MBMS receiving users efficiently at the time of starting the MBMS service. Also, to avoid congestion or collision of response signals in the link due to responses, the response number is wished to be made a certain upper limit value or less. Also, to reduce a measurement error, the response number is wished to be secured to a lower limit value or more (e.g., one or more).

To avoid occurrence of the congestion or the collision in the link because the response number exceeds the upper limit value, the small AP is firstly sent, and if the response number is less or zero, the AP is increased. A method for increasing the AP may involve increasing the AP according to a linear function as shown in the following formula (1), for example. Herein, n denotes the number of updating the AP, a denotes the initial value, and S denotes the increase step width.

$$AP(n)=a+S*(n-1) \qquad (1)$$

Besides, another method for increasing the AP according to an exponential function as shown in the following formula (2) is considered. Where B is a base of exponent, and the other parameters are defined in the same manner as the formula (1).

$$AP(n)=a*B^{(n-1)} \qquad (2)$$

As the related arts, there are Japanese Patent Application Laid-Open No. 2005-252506, National Publication of International Patent Application No. 2006-505979, National Publication of International Patent Application No. 2006-515496, National Publication of International Patent Application No. 2006-515737, and National Publication of International Patent Application No. 2006-526316.

If the AP is increased every time of sending, the response number exceeds the lower limit value at once, whereby the number of MBMS receiving users can be measured by a small number of sending the AP. However, especially when the number of MBMS receiving users is large, there is a problem that the response number is likely to exceed the upper limit value.

On the other hand, if the AP is increased bit by bit, the response number can be suppressed to the upper limit value or less. However, especially when the number of MBMS receiving users is small, the response number is small, whereby there is a problem that it takes a long time to make the measurement.

Accordingly, the conventional AP calculation method has the following problem. With the method for increasing the AP according to the linear function, if the increase step width is large, the response number is likely to exceed the upper limit value at once. On the other hand, if the increase step width is small, it takes a very long time to make the measurement. With the method for increasing the AP according to the exponential function, the measurement in short time can be expected, but since the AP rapidly increases according to the number of updating the AP, the response number rapidly increases halfway, and easily exceeds the upper limit value.

As described above, the response number is suppressed to a permissible value or less by updating appropriately the AP, whereby it is a common problem to avoid occurrence of the congestion or the collision due to responses, and acquire a predetermined number of responses or more in a short time in the communication system, wired or wireless, in which the AP is sent to a plurality of terminals and each terminal reports the terminal information according to the AP.

For example, in a radio communication system, the received signal quality of the radio channel is reported according to the AP, and the transmission power is controlled using this received signal quality. Also, in a wired communication system, the status information of the terminal may be collected.

SUMMARY

Thus, the invention has been achieved to solve the above-mentioned problems, and it is an exemplary object of the invention to provide a response probability calculating device and method that can secure a predetermined number of responses or more in a short time while suppressing occurrence of the congestion or the collision in the link due to responses, and a base station control device and communication system using the same.

A method according to an exemplary aspect of the invention is a response probability calculating method for use in a communication system in which a response probability is sent from a communication network to a plurality of terminals, and the terminals report terminal information to the communication network according to the response probability, including a step of selecting a first calculation formula for monotonously increasing the response probability or a second calculation formula for calculating the response probability using the response probability sent at the previous time and the previous number of responses in accordance with the number of responses from the terminals, and a step of calculating the response probability in accordance with the selected calculation formula.

A device according to an exemplary aspect of the invention is a response probability calculating device for use in a communication system in which a response probability is sent from a communication network to a plurality of terminals, and the terminals report terminal information to the communication network according to the response probability, including a selection unit for selecting a first calculation formula for monotonously increasing the response probability or a second calculation formula for calculating the response probability using the response probability sent at the previous time and the previous number of responses in accordance with the number of responses from the terminals, and a calculation unit for calculating the response probability in accordance with the selected calculation formula.

An exemplary base station control device according to the invention includes the response probability calculating device. Also, an exemplary communication system according to the invention includes the base station control device.

A recording medium according to an exemplary aspect of the invention is a recording medium recording a program for causing a computer to perform a response probability calculating method for use in a communication system in which a response probability is sent from a communication network to a plurality of terminals, and the terminals report terminal information to the communication network according to the response probability, the program including a process of selecting a first calculation formula for monotonously increasing the response probability or a second calculation formula for calculating the response probability using the response probability sent at the previous time and the previous number of responses in accordance with the number of responses from the terminals, and a process of calculating the response probability in accordance with the selected calculation formula.

EXEMPLARY EMBODIMENTS

Figure 1:
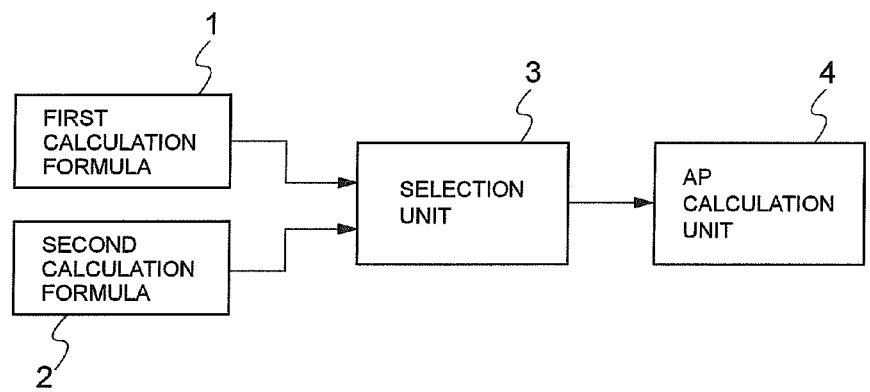
FIG. 1 is a schematic functional block diagram for explaining the principle of the present invention.

Before explaining the exemplary embodiments of the present invention, a principle of the present invention will be described below with reference to FIG. 1 for a better understanding of the invention. Referring to FIG. 1, a first calculation formula 1 and a second calculation formula 2 are prepared in advance. And a selection unit 3 alternatively selects between the first calculation formula 1 and the second calculation formula 2 according to the number of responses at the response probability. An AP calculation unit 4 updates the response probability with the selected calculation formula. The first calculation formula 1 increases monotonously the response probability by a small number of updates. And the second calculation formula 2 calculates the response probability at which the expected value of the number of responses is a target value, using the previous response probability and the previous number of responses.

Thereby, if the number of responses is small, the response probability is updated with the first calculation formula, so that the number of responses can be increased by a small number of updates. Also, if the number of responses is rather large, the response probability is updated with the second calculation formula, so that the number of responses can be suppressed to a permissible value or less.

First Exemplary Embodiment

Figure 2:
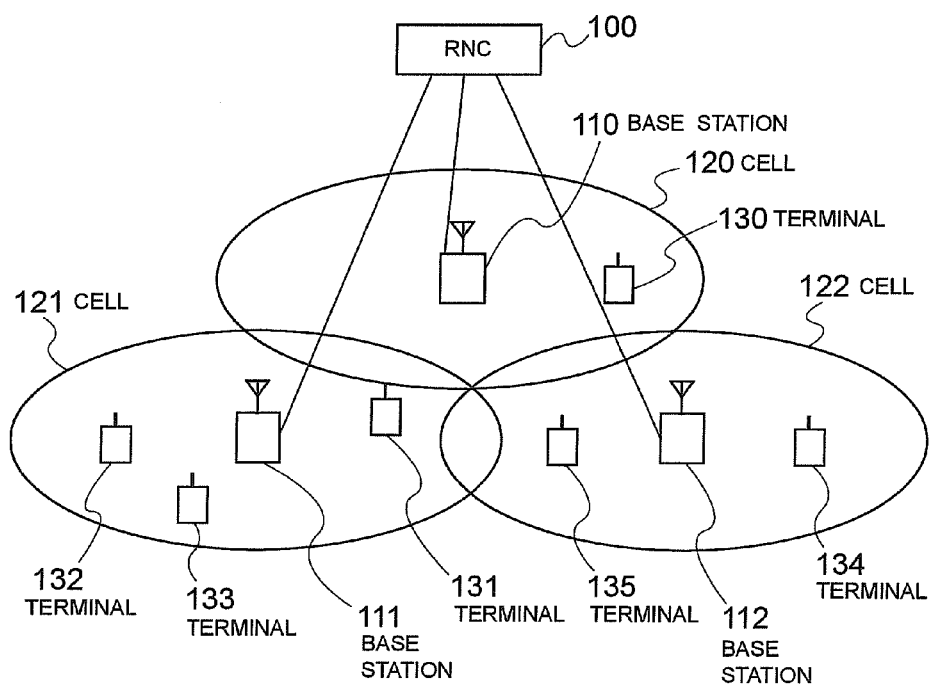
FIG. 2 is a block diagram showing the configuration of a communication system according to a first exemplary embodiment of the invention.

The exemplary embodiments of the present invention will be described below with reference to the drawings. First of all, a first exemplary embodiment of the invention will be described below. FIG. 2 is a diagram showing an example of a radio communication system to which the invention is applied. The system to which the invention is applied comprises a communication network having an RNC 100, the base stations 110 to 112, and the cells 120 to 122 governed by the base stations, and the communicable terminals 130 to 135 accommodated in this communication network. This radio communication system is a W-CDMA system in the form where an MBMS is performed in the system.

The RNS 100 is connected to the base stations 110 to 112. Also, the base station and the terminals can be connected through the uplink and downlink radio channels. Each terminal receives the MBMS data from a sending cell (hereinafter referred to as a serving cell), in which quality of received signal is excellent at the terminal. In this embodiment, when the MBMS data is received, a terminal 130 has a cell 120 as the serving cell at the time of starting the MBMS. Similarly, the terminals 131 to 133 have a cell 121 and the terminals 134 and 135 have a cell 122 as the serving cell.

When the MBMS is performed, the RNC 100 sends the response probability (hereinafter referred to as an AP (Access Probability)) via the base stations 120 to 122 to the terminals 130 to 135 to measure the number of MBMS receiving users. Among the terminals 130 to 135, the terminal desiring to receive the MBMS data responds to the RNC 100 at the AP. The RNC 100 measures the number of MBMS receiving users for each cell on the basis of the number of responses from the terminals. For example, in a case where all of the terminals 131 to 133 desire to receive the MBMS data in FIG. 2, the number of terminals responding simultaneously in the cell 121 is 3, if AP=100% is sent.

Figure 3:
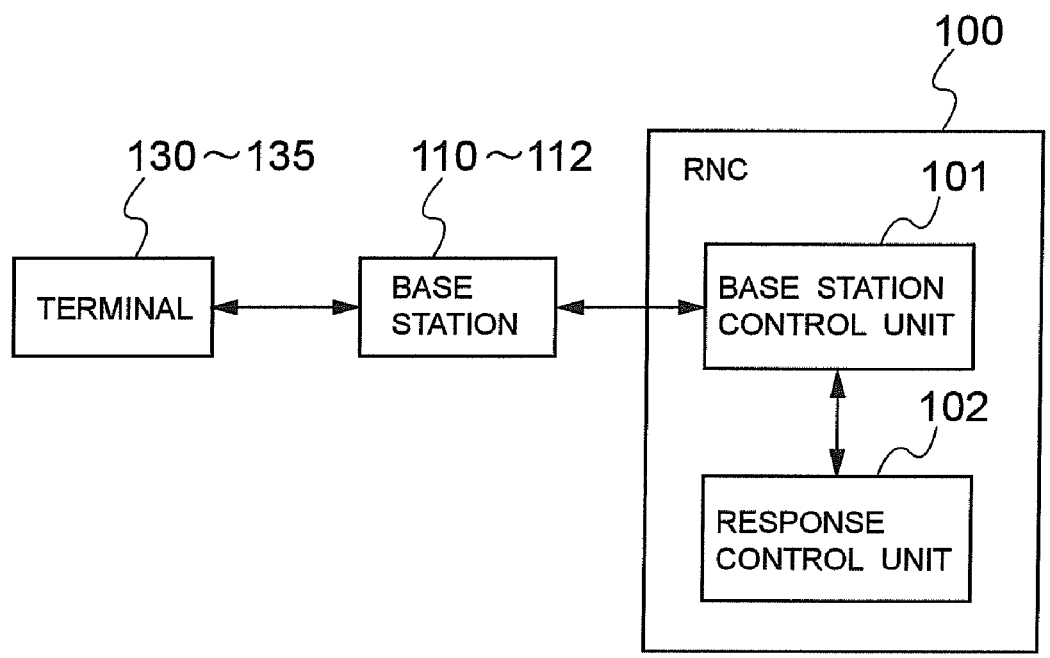
FIG. 3 is a block diagram showing the configuration of a base station control device according to the first exemplary embodiment of the invention.

FIG. 3 is a diagram showing an example of the basic configuration of the RNC 100 in a radio communication system to which the invention is applied. Referring to FIG. 3, the RNC 100 has a base station control unit 101 and a response control unit 102. The base station control unit 101 has the same function as the RNC used in the W-CDMA system. Since its configuration and operation are well known, the explanation thereof is omitted. The response control unit 102 updates the AP properly to send the AP to all the terminals, and measures the number of MBMS receiving users for each cell on the basis of the number of responses from the terminals according to this AP. This response control unit 102 is composed of the functional blocks, as shown in FIG. 1.

Figure 4:
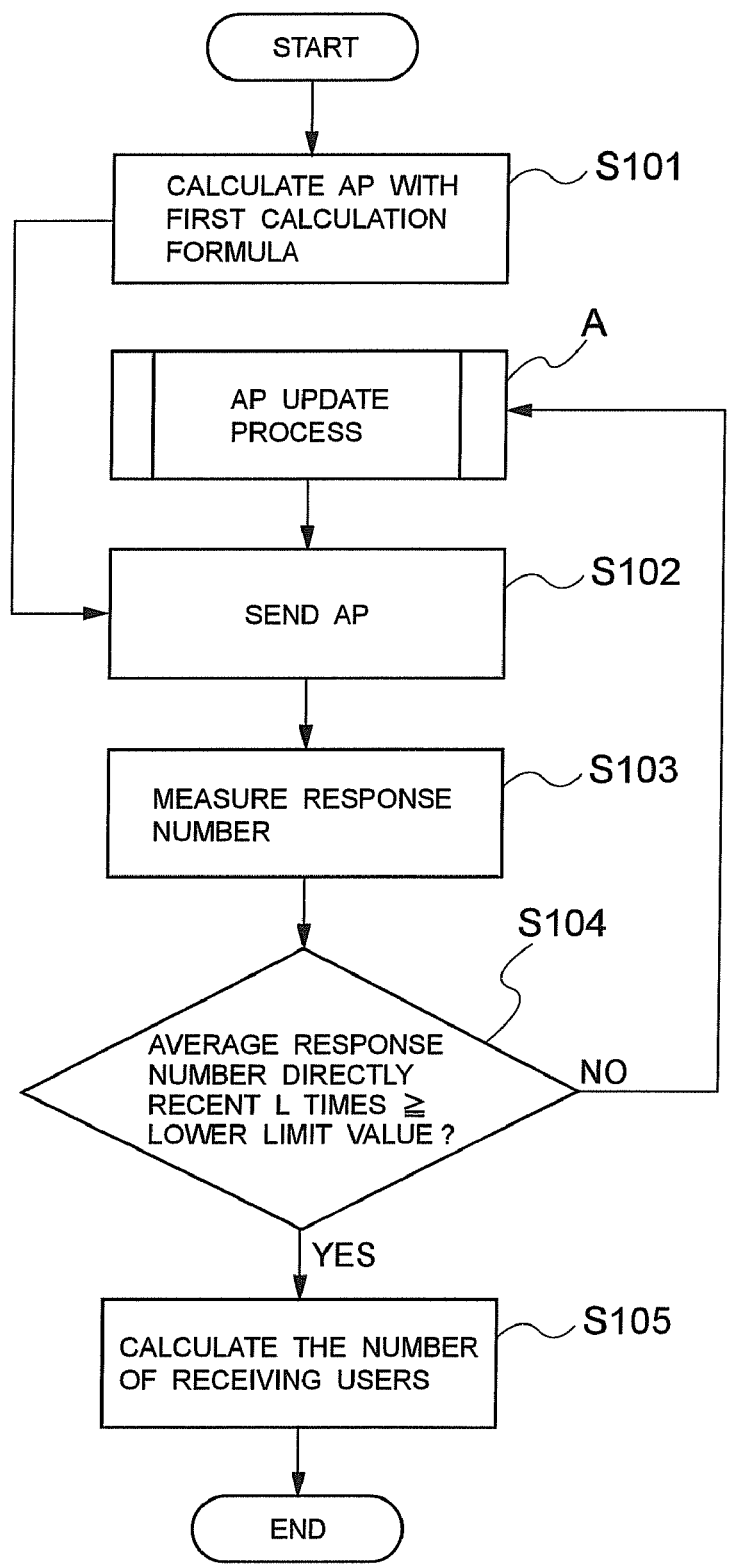
FIG. 4 is a flowchart showing an operation procedure for measuring the number of MBMS receiving users according to the first exemplary embodiment of the invention.

The operation of this embodiment will be described below with reference to the drawings. FIG. 4 is a flowchart showing an operation procedure of the response control unit 102 for measuring the number of MBMS receiving users on the basis of the number of responses from the terminals by sending the AP when the RNC 100 performs the MBMS. In this embodiment, when the average value of the directly recent L numbers of responses is greater than or equal to a lower limit value (=N_low≧1), the number of MBMS receiving users is measured and calculated. Herein, N_low is a lower limit value for reducing the measurement error of the number of MBMS receiving users.

First of all, in sending the AP for the first time, the response control unit 102 calculates AP(k) in accordance with the following formula (3) that is the first calculation formula (step S101).

$$AP(k) = a * B^{(n-1)} \quad \text{(3) (First calculation formula)}$$

Where k denotes the number of sending the AP, n denotes the number of updating the AP in the first calculation formula, a denotes the initial value, and B denotes a base of the exponent. The initial value of n is 1. When the AP is sent for the first time, $AP(k=1) = a * B^{(1-1)} = a$.

Next, the response control unit 102 sends the AP to each terminal (step S102). Then, since the terminal desiring to receive the MBMS data responds at the probability of AP, the number of responses N_res(k) is measured (step S103). Next, if the average value N_res,ave (see the formula (4) below) of the directly recent L numbers of responses N_res(i) (i=k−L+1, to k), including the current number of responses N_res(k), is greater than or equal to N_low (step S104, Yes), the number of MBMS receiving users N_count is calculated in accordance with the following formula (5), and the process is ended (step S105).

If N_res,ave is smaller than N_low, or the number of sending the AP does not reach L, the update calculation of the AP is performed (step A), and the AP is sent again.

$$N\_res, ave = \frac{\sum_{i=k-L+1}^{k} N\_res(i)}{L} \quad (4)$$

$$N\_count = \frac{\sum_{i=k-L+1}^{k} \frac{N\_res(i)}{AP(i)}}{L} \quad (5)$$

The update calculation of the AP (step A) will be described below in detail, using a flowchart showing an operation procedure for the update calculation of the AP in FIG. 5. In this embodiment, when the AP is updated with the first calculation formula, the AP is updated every time of sending it. The reason is to increase the number of responses rapidly. Also, when the AP is updated with the second calculation formula, the AP is not updated in sending the AP directly recent M−1 times. The reason is that the number of responses can be expected to some extent at the previous AP.

First of all, the previous number of responses N_res(k−1) and the first threshold N_thr1 are compared (step S111). If N_res(k−1)<N_thr1 (step S111, Yes), and the first calculation formula is used in updating the AP at the previous time (step S112, Yes), the update number n of the AP with the first calculation formula is incremented by 1 (step S113), and AP(k) is updated with the first calculation formula (step S114).

On the other hand, unless N_res(k−1)<N_thr1 (step S111, No), or the first calculation formula is used in updating the AP at the previous time (step S112, No), a counter j for updating the AP with the second calculation formula is incremented by 1 (step S115). If the remainder of j divided by M is 0 (step S116, Yes), AP(k) is updated with the second calculation formula as represented by the following formula (6) (step S117). At step S116, MOD(x, y) denotes the remainder of x divided by y.

$$AP(k) = N\_target / N\_res(k-1) * AP(k-1) \quad \text{(6) (Second calculation formula)}$$

With the above, if the AP is not updated in sending the AP directly recent M−1 times, the AP can be updated. Where N_target denotes a target value of the number of responses. Next, when the AP is updated with the second calculation formula, j is initialized (step S118). The initial value of j is 0.

The first calculation formula and the second calculation formula will be described below. First of all, the first calculation formula increases exponentially the AP, whereby it is anticipated that the number of responses increases in a short time. The second calculation formula calculates the AP at which the expected value of the number of responses is the target value (N_target) by using the response probability sent at the previous time and the previous number of responses. In this embodiment, to prevent the number of responses from rapidly increasing above an upper limit value, the AP is updated with the second calculation formula after the number of responses is greater than or equal to the first threshold. To update the AP with the second calculation formula before the number of responses increases rapidly to a permissible value or more, N_thr1<N_target is set. Also, if the remainder of j divided by M is not 0 (step S116, No), the AP is not updated.

Example Corresponding to the First Exemplary Embodiment

An example corresponding to the first exemplary embodiment will be described below. In this example, it is assumed that the sending number of the AP sent at this time is six (k=6). First of all, an operation example of FIG. 5 will be described below. The parameters are as follows.

a=0.01, B=2 (in the first calculation formula)

M=2, N_thr1=5, N_target=15 (>N_thr1)

n=4, N_res(5)=5 (previous time), N_res(4)=7, j=1

It is supposed that AP(4) is calculated with the first calculation formula, and AP(5) that is the previous AP is not updated from AP(4).

$$AP(k-2)=AP(4)=a*B^{\wedge}(n-1)=$$
$$0.01*2^{\wedge}(4-1)=0.08 \quad \text{(the first calculation formula)}$$

$$AP(k-1)=AP(5)=AP(4)=0.08$$

Firstly, the response control unit 102 compares the previous response number N_res(5) with the first threshold N_thr1. Since N_res(5)=8<N_thr1=5 is not true (step S111, No), the counter j for updating the AP with the second calculation formula is incremented by 1, whereby j=2 (step S115). Next, it is determined that the AP is updated according to the following formula (step S116), whereby the AP is updated with the second calculation formula (step S117).

$$MOD(j,M)=MOD(2,2)=0$$

$$AP(k=6)=N\_target/N\_res(5)*AP(5)=$$
$$15/5*0.08=0.24 \quad \text{(the second calculation formula)}$$

Finally, the counter j for updating the AP with the second calculation formula is initialized to j=0 (step S118).

An operation example of FIG. 4 after updating the AP according to the flowchart of FIG. 5 will be described below. The parameters are as follows.

$$L=3, N\_low=3$$

The response control unit 102 sends the updated AP (=AP(6)) to the terminals (step S102), and measures the response number N_res(6) (step S103). As a result, it is supposed that N_res(6)=16 is measured. Next, it is determined whether or not the average response number of directly recent L=3 response numbers is greater than or equal to N_low in the following manner (step S104).

$$N\_res,ave=1/3*(N\_res(4)+N\_res(5)+N\_res(6))=1/3*$$
$$(7+5+16)=9.3>N\_low=3$$

Since the average response number is greater than or equal to N_low as above, the number of MBMS receiving users N_count is measured as 72 as in the following formula (7), and the process is ended (step S105).

$$N\_count = \frac{\sum_{i=k-L+1}^{k} \frac{N\_res(i)}{AP(i)}}{L} \qquad (7)$$
$$= \frac{\sum_{i=6-3+1}^{6} \frac{N\_res(i)}{AP(i)}}{3}$$
$$= \frac{\frac{7}{0.08} + \frac{5}{0.08} + \frac{16}{0.24}}{3}$$
$$= 72$$

Second Exemplary Embodiment

A second exemplary embodiment of the invention will be described below. The configuration of this embodiment is the same as that of the first embodiment shown in FIGS. 2 and 3. Next, the operation of this embodiment will be described below with reference to the drawings. In this embodiment, a flowchart showing the operation procedure A for the update calculation of AP is different from the first embodiment as shown in FIG. 5. FIG. 6 is a flowchart showing the operation procedure A for the update calculation of AP according to this embodiment.

Figure 5:
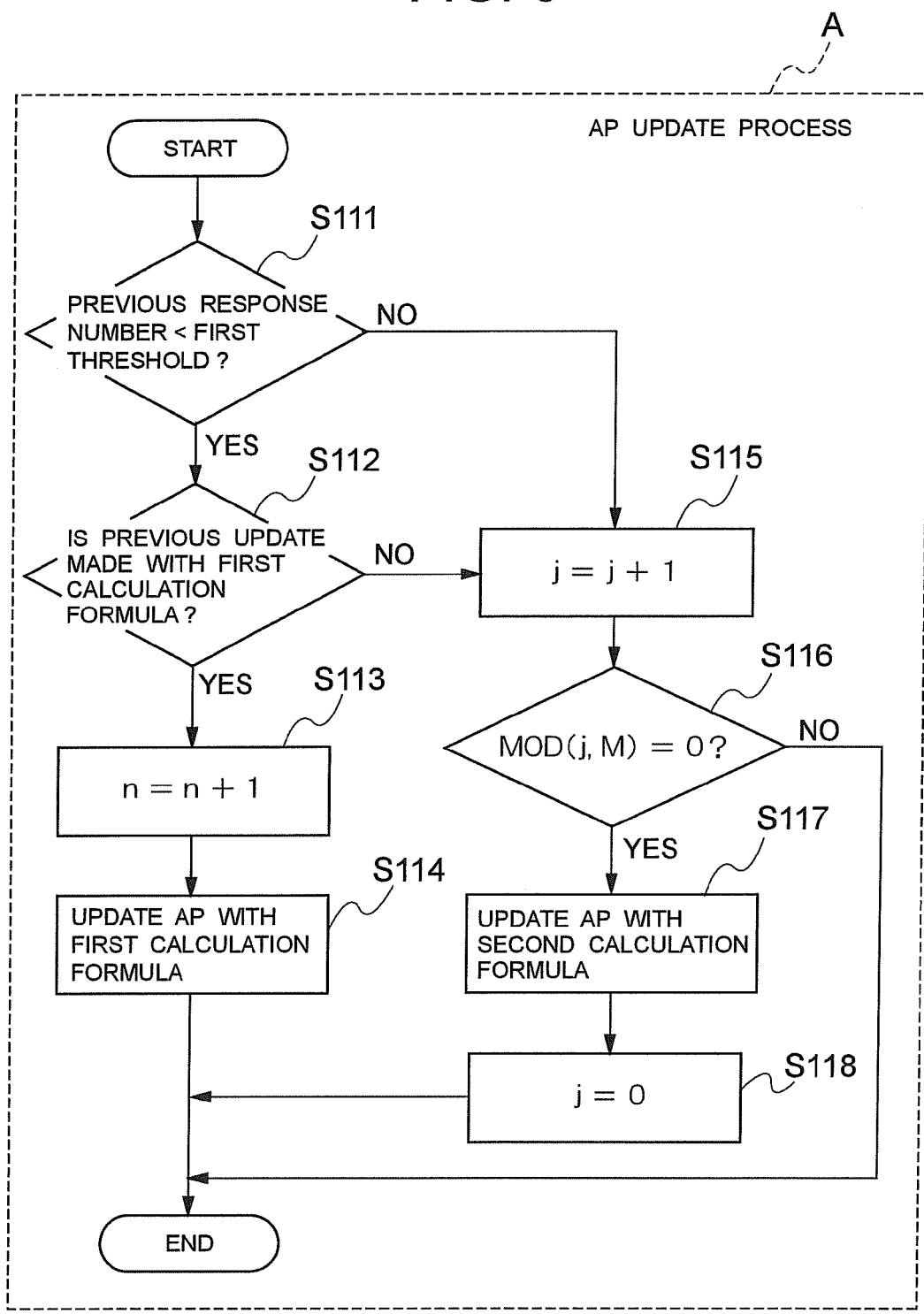
FIG. 5 is a flowchart showing an operation procedure for updating and calculating the AP according to the first exemplary embodiment of the invention.
Figure 6:
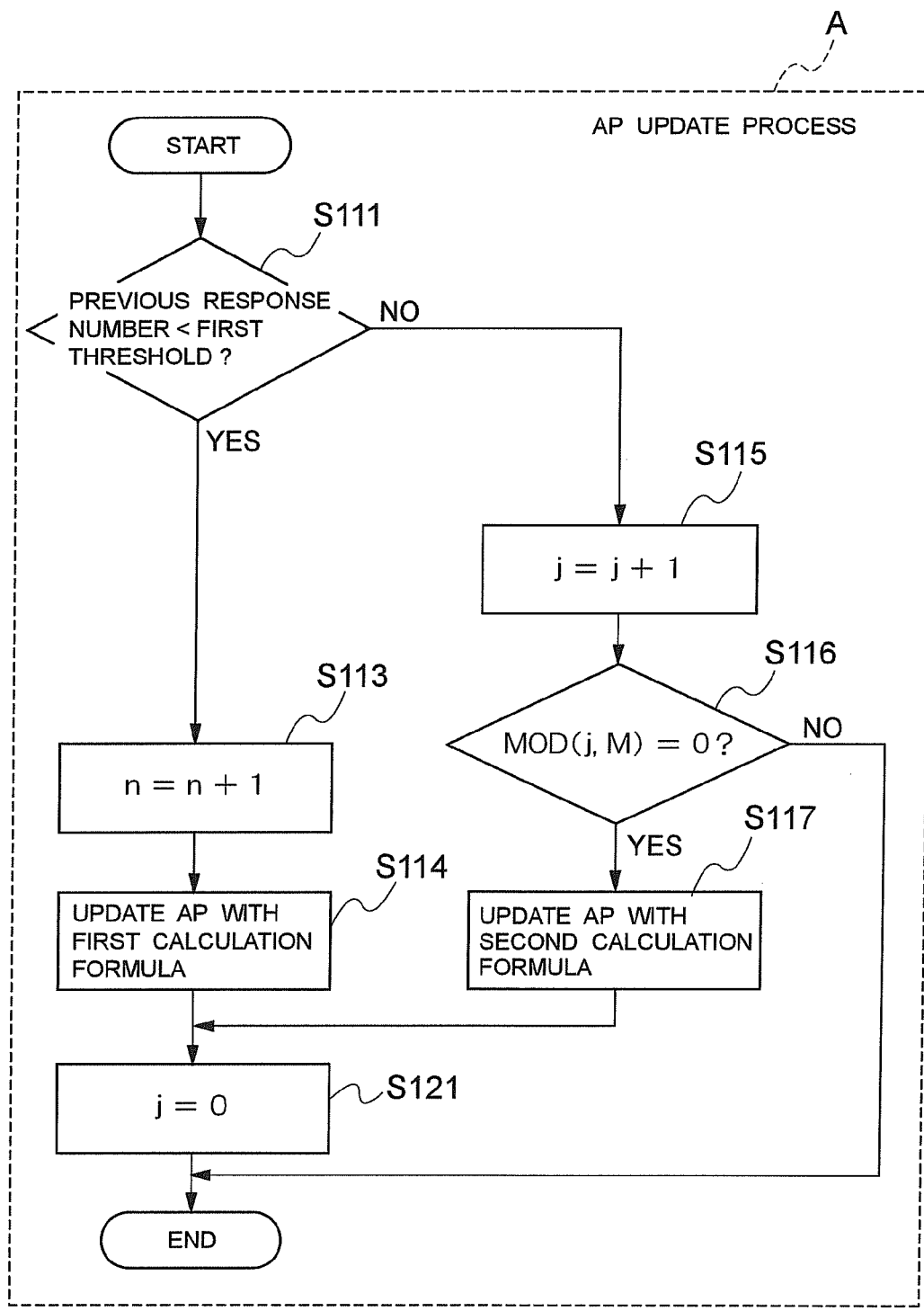
FIG. 6 is a flowchart showing an operation procedure for updating and calculating the AP according to a second exemplary embodiment of the invention.

Referring to FIG. 6, this embodiment is different from the first embodiment in that the step S112 of FIG. 5 is deleted, and the step S118 is deleted and instead a step S121 is added. That is, if N_res(k−1)<N_thr1 (step S111, Yes), the update number n of AP with the first calculation formula is incremented by 1 (step S113), and AP(k) is updated with the first calculation formula (step S114).

Also, if the AP is updated with the first or second calculation formula, the counter j for updating the AP with the second calculation formula is initialized (step S121). The reason why j is initialized when the AP is updated with the first calculation formula, is that the AP can be updated with the first calculation formula after the AP is updated with the second calculation formula in this embodiment. Due to this change, even if the AP is not updated in sending the AP directly recent M−1 times, the AP can be updated with the second calculation formula, like the first embodiment.

If this embodiment is not employed, the AP can be updated only with the second calculation formula because the response number happens to be large, so that it takes a long time for the AP to increase, and a state where the response number is very smaller than the first threshold, continues. By employing this embodiment, it is possible to suppress the continuation of this state.

Third Exemplary Embodiment

A third exemplary embodiment of the invention will be described below. The configuration of this embodiment is the same as that of the first embodiment shown in FIGS. 2 and 3. The operation of this embodiment will be described below with reference to the drawings.

Figure 7:
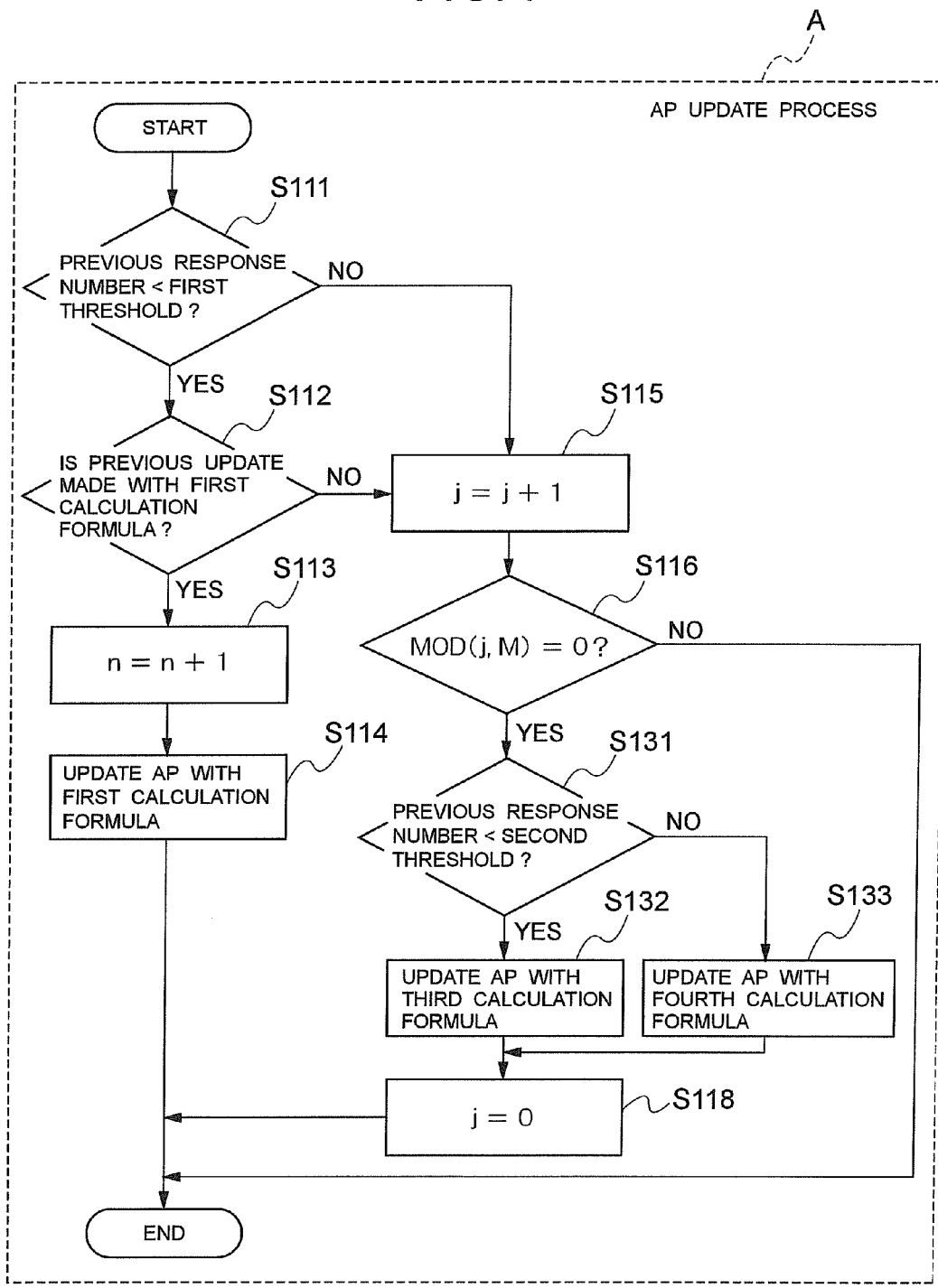
FIG. 7 is a flowchart showing an operation procedure for updating and calculating the AP according to a third exemplary embodiment of the invention.

In this embodiment, a flowchart showing the operation procedure for the update calculation of AP is different from the first embodiment as shown in FIG. 5. FIG. 7 is a flowchart showing the operation procedure for the update calculation of AP. Referring to FIG. 7, the operation of this embodiment is different from the first embodiment in that step S117 of FIG. 5 is replaced with steps S131 to S133.

That is, if the remainder of the counter j for updating the AP with the second calculation formula divided by M is 0 (step S116, Yes), N_res(k−1) and the second threshold N_thr2 are compared (step S131). Since N_thr2 is the target value of the response number, N_thr1<N_thr2 is set in the same manner as the first embodiment. If N_res(k−1) is smaller than N_thr2, AP(k) is updated with the following third calculation formula (step S132). If it is greater than or equal to N_thr2, AP(k) is updated with the following fourth calculation formula (step S133). Herein, S indicates a step width of increment or decrement.

$AP(k)=AP(k-1)+S$ (in the case of N_res(k−1)<N_thr2)    (8) (Third calculation formula)

$AP(k)=AP(k-1)-S$ (in the case of N_res(k−1)≧N_thr2)    (9) (Fourth calculation formula)

The third and fourth calculation formulas will be described below. The third and fourth calculation formulas, like the second calculation formula of the first embodiment, calculates the AP at which the expected value of the response number is the target value. With the third and fourth calculation formulas, the apprehension of the second calculation formula can be improved. That is, the apprehension is that if the previous response number N_res(k−1) happens to be small, the second calculation formula increases AP(k) to the excessively large value, so that the response number N_res(k) increases rapidly. Accordingly, if S is set to a smaller value, AP(k) does not increase extremely, whereby it is possible to suppress rapid increase of N_res(k).

Fourth Exemplary Embodiment

Figure 8:
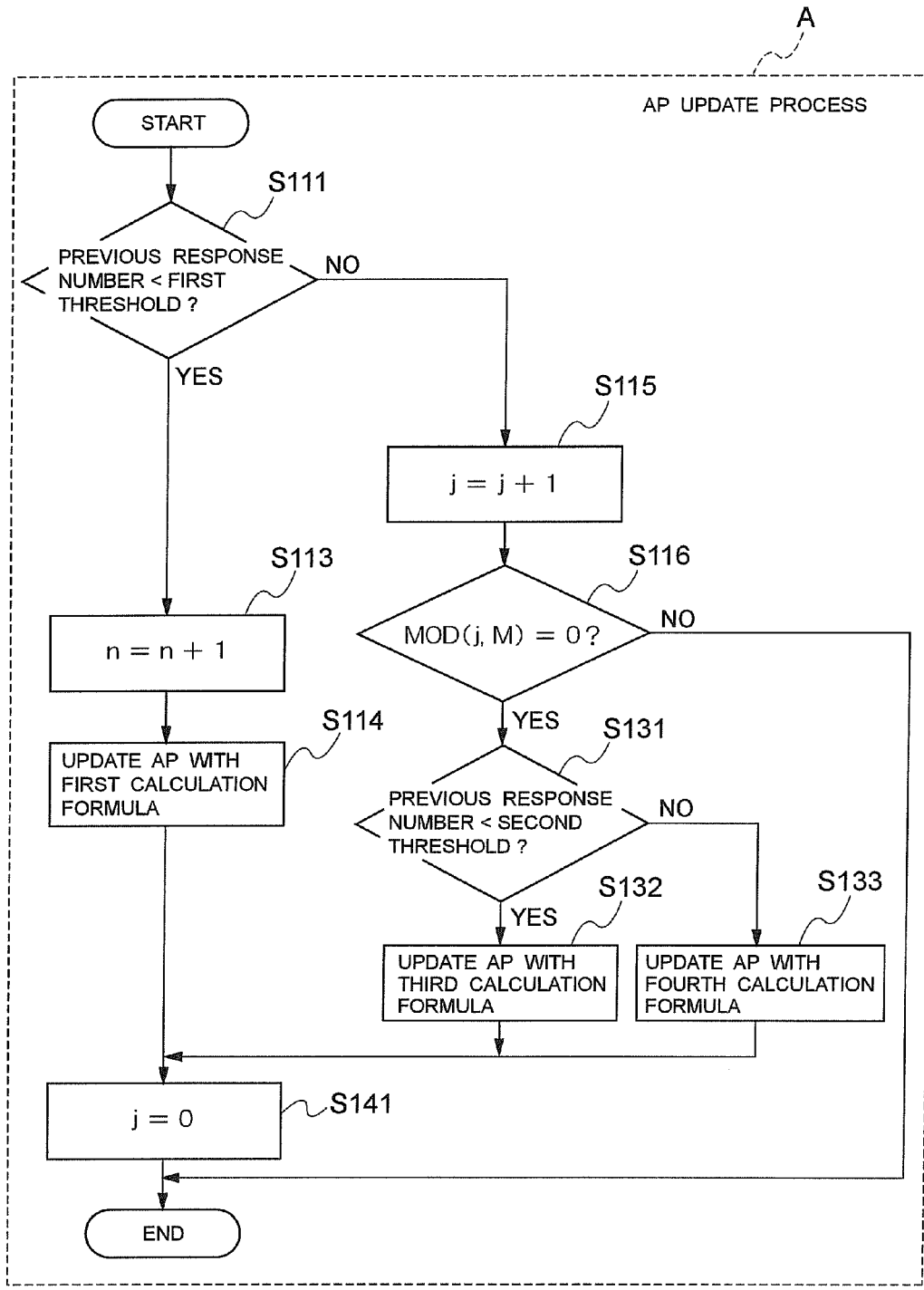
FIG. 8 is a flowchart showing an operation procedure for updating and calculating the AP according to a fourth exemplary embodiment of the invention.

A fourth exemplary embodiment of the invention will be described below. The configuration of this embodiment is the same as that of the first embodiment shown in FIGS. 2 and 3. Next, the operation of this embodiment will be described below with reference to the drawing. In this embodiment, a flowchart showing the operation procedure for the update calculation of AP is different from the third embodiment as shown in FIG. 7. FIG. 8 is a flowchart showing the operation procedure for the update calculation of AP.

Referring to FIG. 8, this embodiment is difference from the third embodiment in that step S112 of FIG. 7 is deleted, and step S118 is deleted and instead step S141 is added. Since this difference is identical to the difference between the second embodiment and the first embodiment, the explanation of the operation is omitted.

If this embodiment is not employed, the AP can be updated only with the third or fourth calculation formula because the response number happens to be large, so that it takes a long time for the AP to increase, and a state where the response number is very smaller than the first threshold, continues. By employing this embodiment, it is possible to suppress the continuation of this state.

Other Exemplary Embodiment

As the other exemplary embodiment, AP may be the same for all the terminals, or the terminals may be divided into plural groups, and AP may be set for each group. For example, in consideration of the terminal density per cell, the small AP is set to the cell in the downtown, while the large AP is set to the cell in the suburbs.

Though, in the above embodiments, the measurement of the number of MBMS receiving users in the W-CDMA system is exemplified, the invention is applicable to the other control. For example, the invention is also applicable to the report of measurement of the received signal quality on the channel in the MBMS with the W-CDMA. If there is any terminal with the channel quality worse than a predetermine level, the cover ratio of MBMS may be controlled to be maintained by increasing the sending power of a common channel SCCPCH for PTM transmission in conformance with the terminal. At this time, if the AP is updated in accordance with the traffic amount on the uplink, it is possible to receive the channel quality information by avoiding the congestion.

Figure 9:
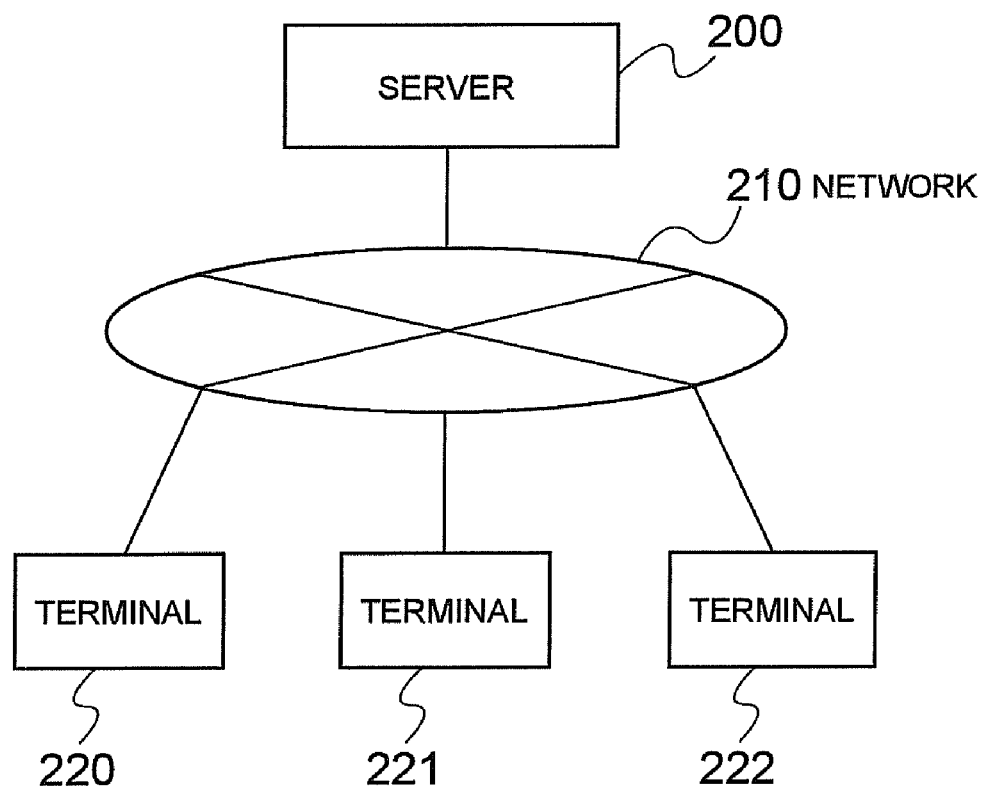
FIG. 9 is a block diagram showing an example of a communication system according to the other exemplary embodiment of the invention.

Also, the invention is applicable to a wired communication system, as shown in FIG. 9, for example. In this communication system, a server 200 is connected via a network 210 to the terminals 220 to 222, as shown in FIG. 9. The server 200 may request the terminal to report the status information in accordance with the AP. At this time, if the server 200 successively updates the AP, depending on a load situation of the server itself, or the congested degree of the link, the status information with the expected response number on average can be received.

An exemplary advantage according to the invention is that if the number of responses is small, the response probability is updated with the first calculation formula for monotonously increasing the response probability by a short number of updates, or if the number of responses is rather large, the response probability is updated with the second calculation formula for calculating the response probability at which the expected value of the number of responses is the target value, using the response probability at the previous time and the previous number of responses, whereby there is an advantage of securing a predetermined number of responses or more in a short time, while suppressing occurrence of congestion or collision of the link due to responses.

It will be apparent that the operation of the above embodiments may be performed by recording the operation procedure as a program on a recording medium such as a ROM, and reading and executing the program on a computer.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A response probability calculating method for use in a communication system in which a response probability is sent from a communication network to a plurality of terminals, and said terminals report terminal information to said communication network according to said response probability, comprising:
    selecting a first calculation formula for monotonously increasing said response probability or a second calculation formula for calculating said response probability using the response probability sent at the previous time and the previous number of responses, in accordance with the number of responses from said terminals; and
    calculating said response probability in accordance with said selected calculation formula.

2. The response probability calculating method according to claim 1, further comprising selecting said first calculation formula until said number of responses exceeds a first threshold, and selecting said second calculation formula after said number of responses exceeds said first threshold.

3. The response probability calculating method according to claim 1, further comprising selecting said first calculation formula if said previous number of responses is smaller than the first threshold and selecting said second calculation formula if said previous number of responses is greater than or equal to said first threshold.

4. The response probability calculating method according to claim 1, wherein said first calculation formula is an exponential function.

5. The response probability calculating method according to claim 1, wherein said second calculation formula calculates the response probability at which the expected value of said number of responses is a target value.

6. The response probability calculating method according to claim 1, further comprising sending the same data to said plurality of terminals, wherein said terminal information is the information indicating that said terminal receives said same data sent thereto.

7. The response probability calculating method according to claim 1, wherein said terminal information is the information indicating the received signal quality of said terminal.

8. The response probability calculating method according to claim 1, wherein said terminal information is the status information of said terminal.

9. A response probability calculating device for use in a communication system in which a response probability is sent from a communication network to a plurality of terminals, and said terminals report terminal information to said communication network according to said response probability, comprising:
- a selection unit for selecting a first calculation formula for monotonously increasing said response probability or a second calculation formula for calculating said response probability using the response probability sent at the previous time and the previous number of responses, in accordance with the number of responses from said terminals; and
- a calculation unit for calculating said response probability in accordance with said selected calculation formula.

10. The response probability calculating device according to claim 9, wherein said selection unit selects said first calculation formula until said number of responses exceeds a first threshold and selects said second calculation formula after said number of responses exceeds said first threshold.

11. The response probability calculating device according to claim 9, wherein said selection unit selects said first calculation formula if said previous number of responses is smaller than the first threshold and selects said second calculation formula if said previous number of responses is greater than or equal to said first threshold.

12. The response probability calculating device according to claim 9, wherein said first calculation formula is an exponential function.

13. The response probability calculating device according to claim 9, wherein said second calculation formula calculates the response probability at which the expected value of said number of responses is a target value.

14. The response probability calculating device according to claim 9, further comprising a sending unit for sending the same data to said plurality of terminals, wherein said terminal information is the information indicating that said terminal receives said same data sent thereto.

15. The response probability calculating device according to claim 9, wherein said terminal information is the information indicating the received signal quality of said terminal.

16. The response probability calculating device according to claim 9, wherein said terminal information is the status information of said terminal.

17. A base station control device having the response probability calculating device according to claim 9.

18. A mobile communication system having the base station control device according to claim 17.

19. A recording medium recording a program for causing a computer to perform a response probability calculating method for use in a communication system in which a response probability is sent from a communication network to a plurality of terminals, and said terminals report terminal information to said communication network according to said response probability, said program comprising:
- a process of selecting a first calculation formula for monotonously increasing said response probability or a second calculation formula for calculating said response probability using the response probability sent at the previous time and the previous number of responses, in accordance with the number of responses from said terminals; and
- a process of calculating said response probability in accordance with said selected calculation formula.

20. A response probability calculating device for use in a communication system in which a response probability is sent from a communication network to a plurality of terminals, and said terminals report terminal information to said communication network according to said response probability, comprising:
- a selection means for selecting a first calculation formula for monotonously increasing said response probability or a second calculation formula for calculating said response probability using the response probability sent at the previous time and the previous number of responses, in accordance with the number of responses from said terminals; and
- a calculation means for calculating said response probability in accordance with said selected calculation formula.

* * * * *